US 8,260,790 B2

(12) United States Patent  
Barlow et al.

(10) Patent No.: US 8,260,790 B2
(45) Date of Patent: Sep. 4, 2012

(54) SYSTEM AND METHOD FOR USING INDEXES TO PARSE STATIC XML DOCUMENTS

(75) Inventors: Jeff Barlow, Los Angeles, CA (US); Longbao Luo, Roseville, CA (US); Lakshminarayana Mandaleeka, Santa Clara, CA (US); Rishi Kaundinya Mutnuru, Sunnyvale, CA (US); Tien-You Chen, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1050 days.

(21) Appl. No.: 11/790,894

(22) Filed: Apr. 27, 2007

(65) Prior Publication Data
US 2008/0270345 A1    Oct. 30, 2008

(51) Int. Cl.
*G06F 7/08* (2006.01)
*G06F 17/30* (2006.01)
(52) U.S. Cl. .................. 707/755; 707/804; 715/239
(58) Field of Classification Search .................. 707/755, 707/804
See application file for complete search history.

(56) References Cited

U.S. PATENT DOCUMENTS

| | | | |
|---|---|---|---|
| 7,133,857 B1* | 11/2006 | Zhang et al. | 715/234 |
| 7,577,946 B2* | 8/2009 | Murakami et al. | 717/145 |
| 7,725,817 B2* | 5/2010 | Krasun et al. | 715/236 |
| 7,761,459 B1* | 7/2010 | Zhang et al. | 707/755 |

OTHER PUBLICATIONS

Bressan, Acclerating Queries by pruning XML documents, Data & Knowledge Engineering 54 (2005), pp. 211-240.*
VTD: A Technical Perspective, 2004, pp. 1-16.*
Shaw, Richard Hale, PC Magazine , vol. 10, n. 10, Clarion Professional Developer, May 28 , 1991, p. 112.*
Bhattacharya, Coordinating Backup/Recovery and Data Consistency Between Database and File Systems, ACM SIGMOD'2002, Jun. 2002, pp. 1-12.*
Zhang, Non-Extractive Parsing for XML, May 19, 2004, pp. 1-5.*
Cut, paste, split, and assemble XML documents with VTD-XML VTD-XML eliminates the performance overhead associated with updating XML, JavaWorld.com, Jul. 24, 2006, pp. 1-13.*

\* cited by examiner

*Primary Examiner* — Rehana Perveen
*Assistant Examiner* — Albert Phillips, III

(57) ABSTRACT

A method, executed on a computing device, and a corresponding system, allow software applications to easily access data contained in a static XML document by parsing the static XML document. For each node in the XML document, a Node Offset value is determined. The Node Offset value is then stored and serves as an index offset value, where the index offset value is used by the software applications to retrieve the data contained in the static XML document.

20 Claims, 9 Drawing Sheets

SYSTEM AND METHOD FOR USING INDEXES TO PARSE STATIC XML DOCUMENTS

BACKGROUND

The extensible markup language (XML) is a type of markup languages for describing (marking up) a semantic structure of a document with simple marks. XML allows a user to carry out a user-original extension by defining a grammar and imparting logical senses to constituents of the document.

XML documents may be intended to conform to a document type definition (DTD), and software programs can determine whether an XML document does so conform. For example, a DTD may include a grammatical rule to the effect that nodes <TITLE>, <AUTHOR> and <PUBLISHER> appear once in this specific order after a node <BOOK>. Then, it is possible to determine whether a certain XML document accords with the grammatical rule or not.

To conform to a specific DTD, an XML document expresses its data structure universally by using certain marks, or tags, which may be stored with the XML document. Accordingly, the XML document has a characteristic of a larger file size in comparison with many other file formats.

By virtue of its tag-based nature, XML also defines a strict tree structure or hierarchy. XML elements are structural constructs that consist of a start tag, an end or close tag, and the information or content that is contained between the tags. A start tag is formatted as "<tagname>" and an end tag is formatted as "</tagname>". In an XML document, start and end tags can be nested within other start and end tags. All elements that occur within a particular element must have their start and end tags occur before the end tag of that particular element. It is this requirement that defines the tree-like structure that is a characteristic of XML documents. Each element forms a node in this tree, and each node potentially has child or branch nodes. A child nodes represent any XML elements that occur between the start and end tags of a parent node.

A software application may be intended to interact with, or read a specific XML document. One way to enable this interaction is for such an XML document to first have its content parsed using a specific software device called a parser. A parser reads an XML document and creates an output that an application, such as a Web browser, then can use, for example, to generate a display. The output that the parser generates is based on the XML document's content and the markup used to describe that content. In some instances, the document is compared to rules specified in its DTD. DTD-conforming XML documents are called valid. Parsers that have the ability to compare a document to its DTD and determine whether the document is valid are called validating parsers. Even if an XML document is not validated, the XML document still may conform to general rules of document creation established in the XML specification. Documents that obey the general rules are called well formed.

There are at least two ways to parse an XML document: using a DOM (Document Object Model) parser and using a SAX (Simple API for XML) parser. The DOM parser reads the entire document into memory and creates the tree-like structure comprising a series of nodes. The tree-like structure is also stored in memory, thereby increasing the memory requirements for this method. Furthermore, creation of the tree-like structure is CPU intensive, as is the subsequent parsing of the data populating the structure.

In contrast to the DOM parser, the SAX parser normally does not read the entire document into memory. Instead, the SAX parser reads a section of the XML document into memory and then parses the section. The SAX parser may continue this operation until the entire XML document is parsed. As the XML document is parsed, the SAX parser calls to sub routines that are registered to address a specific type of element the Sax parser encounters in the XML document. Although the SAX parser by design consumes less amount of memory than the DOM parser, there are certain drawbacks which make SAX parsing CPU and I/O intensive. For example, sometimes, the entire XML document needs to be read into memory. Also, SAX parsing is unidirectional; previously parsed data cannot be re-read without starting the parsing operation again.

A disadvantage with both DOM and SAX parsers is a large library that is used to define the syntax and rules for parsing XML documents. The large library means more demand on memory. An associated issue is that most XML parser libraries are defined for dynamic XML documents. A dynamic XML document is one in which all or part of the document content is provided by call to programs, such as Web services, with other data provided explicitly. Because of the dynamic nature of these XML documents, the XML parser library is highly redundant, which places even more demands on memory.

DESCRIPTION OF THE DRAWINGS

The detailed description will refer to the following drawings in which like numerals refer to like items, and in which.

DETAILED DESCRIPTION

Figure 1:
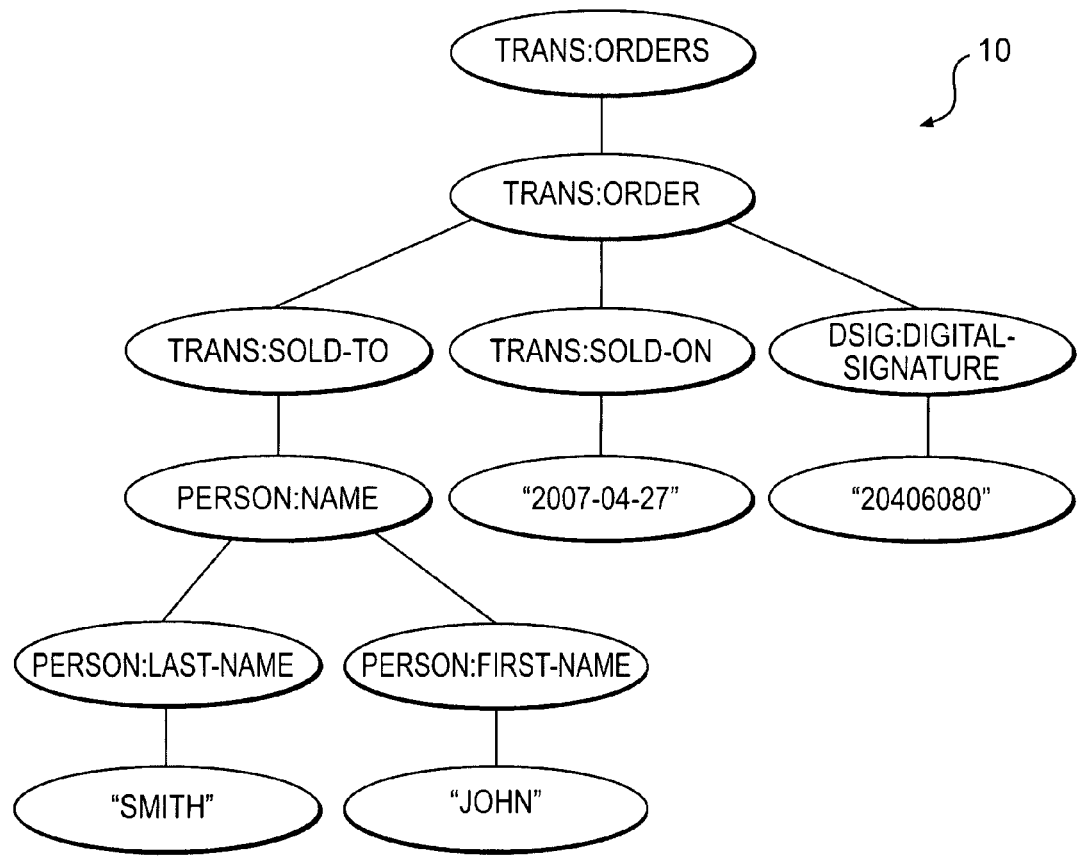
FIG. 1 illustrates the hierarchical tree structure of an exemplary XML document.

To illustrate a tree structure constructed from XML data, consider an exemplary XML data exchange between different entities, such as client and server computers, in the form of requests and responses. A client might generate a request for information or a request for a certain server action, and a server might generate a response to the client that contains the information or confirms whether the action has been performed. The content of these requests and responses are XML documents. In many cases, the process of generating these XML documents involves building, in memory, a hierarchical tree structure. Once the hierarchical tree structure is built in its entirety, the actual XML document in proper syntactic form can be assembled. Consider the following exemplary XML code:

```
<trans:orders      xmlns:person="http://www.schemas.org/people"
xmlns:dsig=http://dsig.org
xmlns:trans="http://www.schemas.org/transactions">    <trans:order>
<trans:sold-to> <person:name> <person:last-name>Smith</person:last-
name> person:first-name>John</person:first-name>    </person:name>
</trans:sold-to> <trans:sold-on>20070427</           <dsig:digital-
trans:sold-on>
signature>20406080</dsig:digital-signature>          </trans:order>
</trans:orders>.
```

This code includes three XML namespace declarations that each are designated with "xmlns". A namespace refers to a dictionary or set of element names defined by a database schema. Namespaces ensure that element names do not conflict, but do not provide instructions on how to process the elements. Software document readers still need to know what the elements mean and decide how to process them.

Within an XML document, namespace declarations occur as attributes of start tags. Namespace declarations are of the form "xmlns:[prefix]=[uri]". A namespace declaration indicates that the XML document contains element names that are defined within a specified namespace or schema. For example, "prefix" is an arbitrary designation that will be used in the XML document as an indication that an element name is a member of the namespace declared by universal resource indicator "uri". The prefix is valid only within the context of the specific XML document. "Uri" is either a path to a document describing a specific namespace or a globally unique identifier of a specific namespace. Uri is valid across all XML documents. Namespace declarations are inherited, which means that a namespace declaration applies to the element in which it was declared as well as to all elements contained within that element.

With reference to the above XML code, the namespace declarations include a prefix, e.g. person, dsig, and trans, and the expanded namespace to which each prefix refers, e.g. http://www.schemas.org/people, http://dsig.org, and http://www.schemas.org/transactions, respectively. This code tells any software document reader that if an element name begins with dsig, its meaning is defined by whoever owns the http://www.dsig.org namespace. Similarly, elements beginning with the person prefix have meanings defined by the http://www.schemas.org/people namespace and elements beginning with the trans prefix have meanings defined by the http://www.schemas.org/transactions namespace.

FIG. 1 shows a hierarchical tree structure 10 that represents the structure of the above XML code. The tree's nodes correspond to elements parsed from an XML document. Such a structure is typically constructed in memory, with each node containing all data necessary for the start and end tags of that node.

Figure 2:
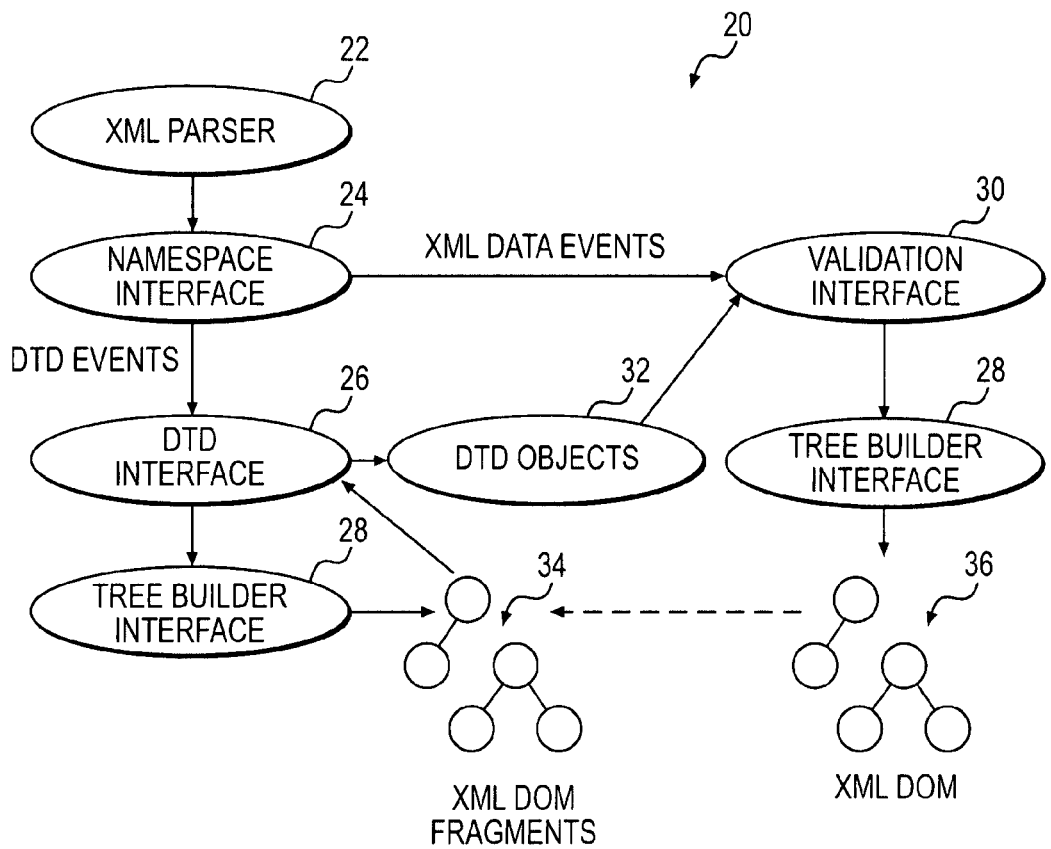
FIG. 2 is a block diagram of an exemplary software architecture for parsing the XML document using a DOM parser and creating tree structures.

FIG. 2 shows an exemplary software architecture 20 for processing XML documents using a DOM parser. A software architecture for parsing XML documents using a SAX parser would be similar to the architecture 20. The architecture 20 includes an XML parser 22 that receives and parses XML data. The XML data may arrive in a variety of ways, including as a stream, a URL (universal resource locator), or text. Parsing the XML data results in a list of events. Also, as the parser 22 parses the XML data, the parser calls to one or more interfaces that build node objects used to construct an in-memory tree representation of the XML document. The interfaces may also be used to search the XML document, without building a node object. Custom interfaces can be constructed to build different kinds of object hierarchies that reflect the XML document.

The architecture 20 is shown with four interfaces, including a namespace interface 24, a DTD interface 26, a tree builder interface 28, and a validation interface 30. The XML parser 22 calls the namespace interface 24, which outputs a sequence of name tokens. DTD events are passed to the DTD interface 26 and XML data events are passed to the validation interface 30. The DTD interface builds DTD objects 32 from the DTD events. The DTD objects 32 are used for validating the XML data. The DTD interface 26 may also delegate to the tree builder interface 28, which builds XML DOM fragments 34 for pieces of the tree structure, or XML DOM.

The validation interface 30 receives the XML data events from the namespace interface 24 and uses the DTD objects 32 to evaluate whether the data complies with certain constraints defined by the DTD objects. If the XML data is valid, the tree builder interface 28 builds a complete XML DOM 36 for the XML data. Some elements of the XML DOM 36 may reference fragments 34.

Figure 3:
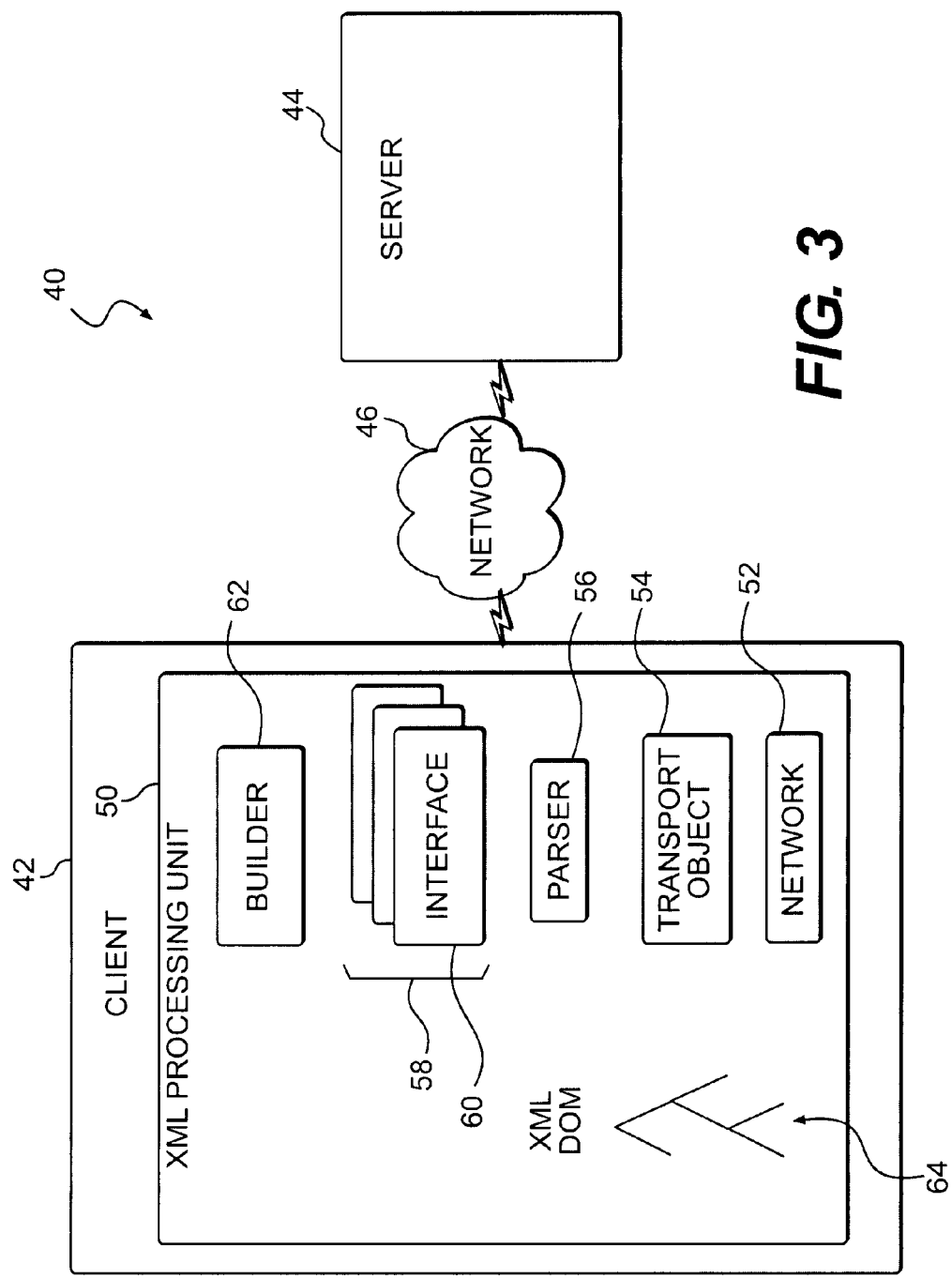
FIG. 3 is a block diagram of an exemplary client-server environment in which XML documents are processed.

FIG. 3 shows an exemplary client-server system 40 in which XML documents or data streams are exchanged between a client 42 and a server 44 over a network 46 (e.g., the Internet). The client 42 runs one or more applications that generate requests for XML data and receive responses to those requests in the form of XML documents.

The client 42 implements an XML processing software architecture 50 that sends, receives, and processes XML documents. The server 44 is equipped with a similar architecture, but will not be described here for brevity purposes. The XML processing software architecture 50 includes a network module 52 (e.g., TCP/IP module) to facilitate connection to the network 46 and a transport object 54 (e.g., a Distributed Authoring and Versioning (WebDAV) transport object) to handle requests and responses over the network. Upon receipt of an XML document, the transport object 54 pushes the XML document into an XML parser 56. The parser 56 parses the XML data stream into individual elements of schema and data. The schema elements establish a schema for an associated application (not shown), while the data element are validated against the schema and if valid, are used to form an in-memory tree representation of the XML document.

The parser 56 calls one or more interfaces 58 to construct the in-memory tree representation of the XML document. Interface 60 receives calls from the parser 56 and delegates the work to builder interface 62. The builder interface 62 converts the schema elements contained in the calls to DTD objects. The DTD objects are then used to validate the XML data from the parsed XML document to determine whether the data is valid for the particular schema associated with the application. If valid, the XML data is used to form an in-memory tree representation, which is also known as an XML DOM 64.

Figure 4:
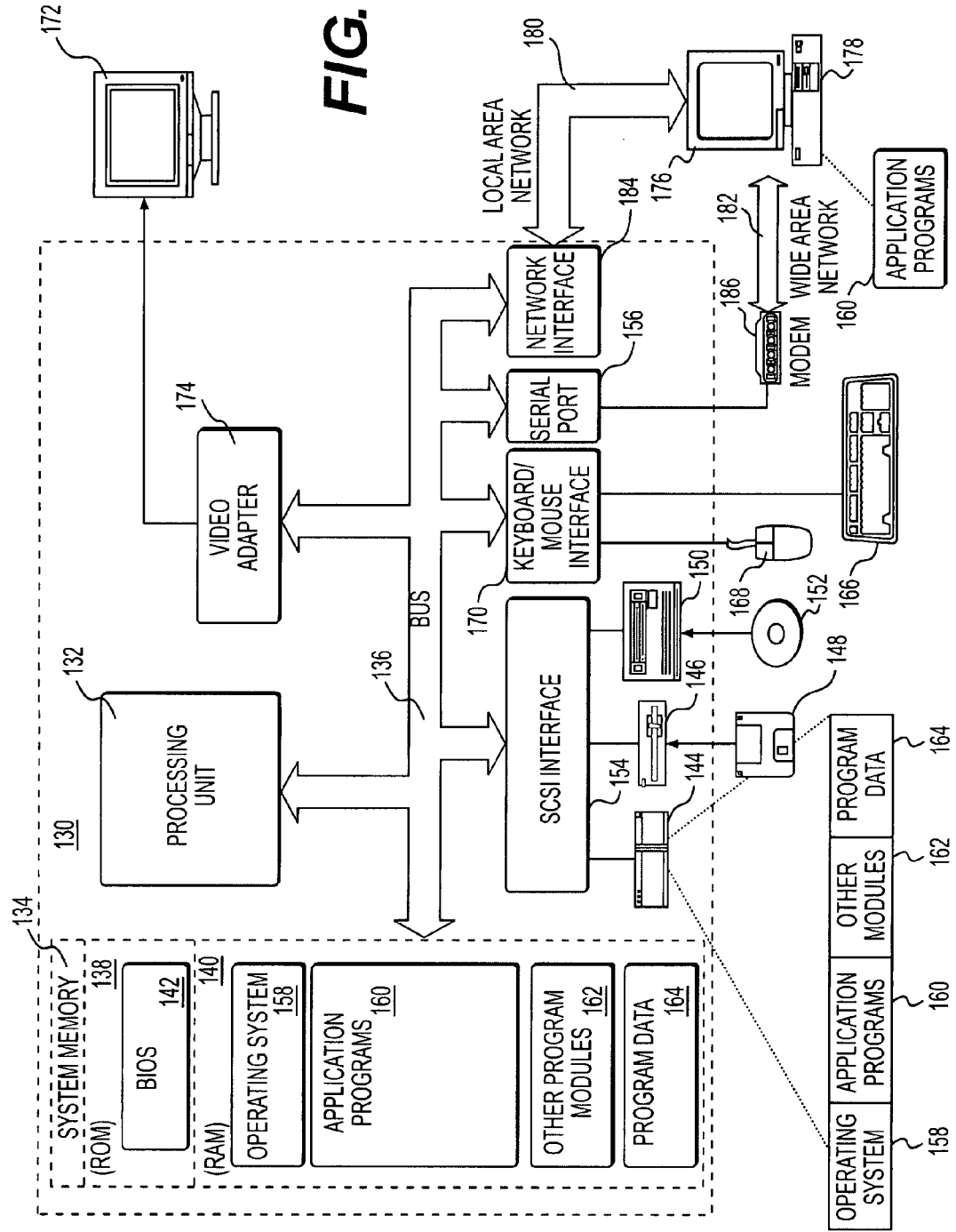
FIG. 4 is a block diagram of an exemplary computer system for processing XML documents.

FIG. 4 shows an exemplary computer system 130 that can be used in accordance with the herein disclosed system and method for parsing static XML documents. As used herein, the term static XML document refers to a document whose content, compared to that of a dynamic XML document, changes infrequently. Various numbers of computers such as that shown can be used in the context of a distributed computing environment. The computer system 130 is representative of one implementation of a client/server architecture.

The computer system 130 includes one or more processors or processing units 132, a system memory 134, and a bus 136 that couples various system components including the system memory 134 to processors 132. The bus 136 represents one or more of any of several types of bus structures, including a memory bus or memory controller, a peripheral bus, an accelerated graphics port, and a processor or local bus using any of a variety of bus architectures. The system memory 134 includes read only memory (ROM) 138 and random access memory (RAM) 140. A basic input/output system (BIOS) 142, containing the basic routines that help to transfer information between elements within the computer system 130, such as during start-up, is stored in ROM 138.

The computer system 130 further includes a hard disk drive 144 for reading from and writing to a hard disk (not shown), a magnetic disk drive 146 for reading from and writing to a removable magnetic disk 148, and an optical disk drive 150 for reading from or writing to a removable optical disk 152 such as a CD ROM or other optical media. The hard disk drive 144, magnetic disk drive 146, and optical disk drive 150 are connected to the bus 136 by a SCSI interface 154 or some other appropriate interface. The drives and their associated computer-readable media provide nonvolatile storage of computer-readable instructions, data structures, program modules and other data for the computer system 130. Although the exemplary environment described herein employs a hard disk, a removable magnetic disk 148 and a removable optical disk 152, other types of computer-readable media which can store data that is accessible by a computer, such as magnetic cassettes, flash memory cards, digital video disks, random access memories (RAMs), read only memories (ROMs), and the like, may also be used.

A number of program modules may be stored on the hard disk, magnetic disk 148, optical disk 152, ROM 138, or RAM 140, including an operating system 158, one or more application programs 160, other program modules 162, and program data 164. A user may enter commands and information into the computer system 130 through input devices such as a keyboard 166 and a pointing device 168. These and other input devices are connected to the processing unit 132 through an interface 170 that is coupled to the bus 136. A monitor 172 or other type of display device is also connected to the bus 136 via an interface, such as a video adapter 174. In addition to the monitor, personal computers typically include other peripheral output devices (not shown) such as speakers and printers.

The computer system 130 may operate in a networked environment using logical connections to one or more remote computers, such as a remote computer 176. The remote computer 176 may be a personal computer, a server, a router, a network PC, a peer device or other common network node, and typically includes many or all of the elements described above relative to the computer system 130, although only a memory storage device 178 has been illustrated. The logical connections include a local area network (LAN) 180 and a wide area network (WAN) 182.

When used in a LAN networking environment, the computer system 130 is connected to the local network 180 through a network interface or adapter 184. When used in a WAN networking environment, the computer system 130 may include a modem 186 or other means for establishing communications over the wide area network 182, such as the Internet. The modem 186, which may be internal or external, is connected to the bus 136 via a serial port interface 156. In a networked environment, program modules depicted relative to the computer system 130, or portions thereof, may be stored in the remote memory storage device. The network connections shown are exemplary and other means of establishing a communications link between the computers may be used.

Generally, the data processors of the computer system 130 are programmed by means of instructions stored at different times in the various computer-readable storage media of the computer. Programs and operating systems are typically distributed, for example, on CD-ROMs. From there, they are installed or loaded into the secondary memory of a computer. At execution, they are loaded at least partially into the computer's primary electronic memory. The methods and systems described herein include these and other various types of computer-readable storage media when such media contain instructions or programs for implementing the steps described below in conjunction with a microprocessor or other data processor.

For purposes of illustration, programs and other executable program components such as the operating system are illustrated herein as discrete blocks. Such programs and components reside at various times in different storage components of the computer, and are executed by the data processor(s) of the computer.

Figure 7:
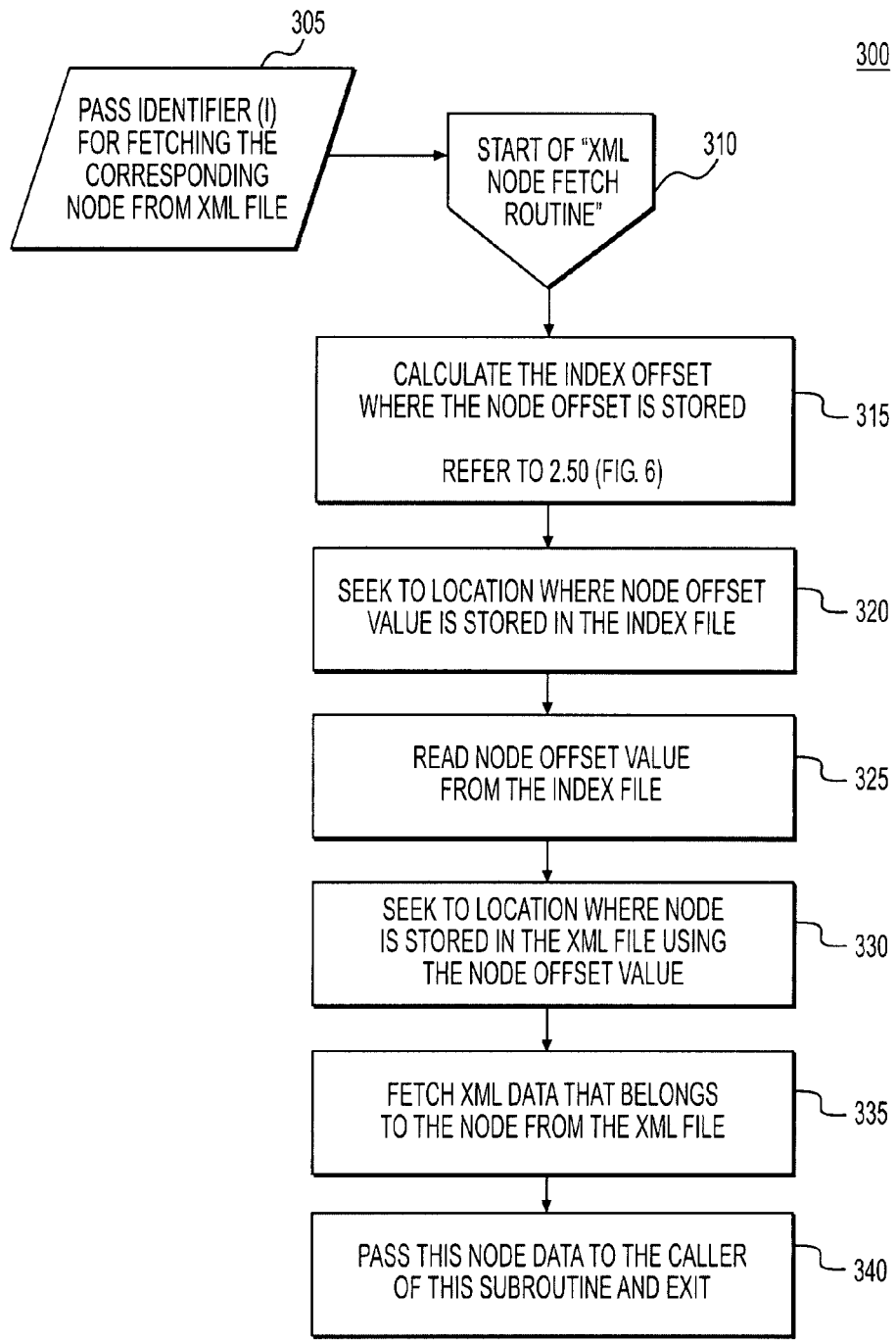
FIG. 7 is a flowchart illustrating an exemplary XML node fetch routine.

In the computer system 130, an application 160 typically gets an identifier and needs to fetch all the associated data that this identifier represents. The associated data are stored under a node within the XML document and this node is what the identifier represents. There are several such nodes within an XML document and thus several unique identifiers. In the simple case (which is described first), assume that the identifiers for a particular type of node in the XML document are low valued, unique integer values. The location where each of these nodes begins within the XML document is referred to herein as a Node Offset. The Node Offset itself is defined as the distance from a starting point in the XML document to a particular node. The index is constructed by parsing through the entire XML document once, and storing the offset into the XML document where each of these nodes start into the index file. By accessing and using these Node Offsets, an application could seek directly to the desired node in the XML document without having to parse through the entire XML document. FIG. 7, which will be described in more detail later, is a flow chart that illustrates how a particular node is accessed given such an Identifier.

Figure 6:
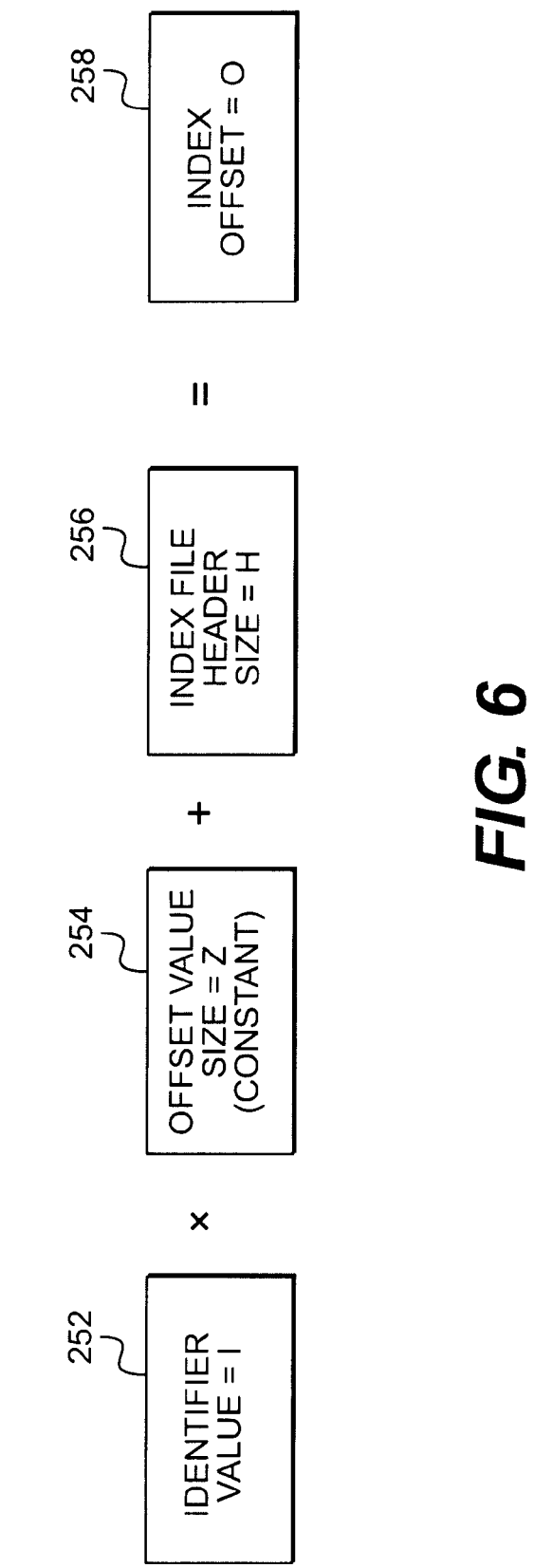
FIG. 6 is a block diagram of an exemplary algorithm for computing node offsets to be stored in the index file.

FIG. 6, which also will be described in detail later, is a block diagram of an exemplary algorithm 250 for storing the Node Offsets within an index file such that the offset values can be retrieved efficiently by calculations using the identifier. The locations where the Node Offsets are stored within the Index files are referred to hereafter as an Index Offset.

The Node Offset values are maintained in the Index file and are stored sequentially such that given an Identifier, the application 160 could calculate the location where the corresponding Node Offset value is stored. The offset in the actual XML document can then be fetched from the Index file, and by seeking to this value in the XML document, the applicable node within the XML document can be retrieved directly.

Figure 8:
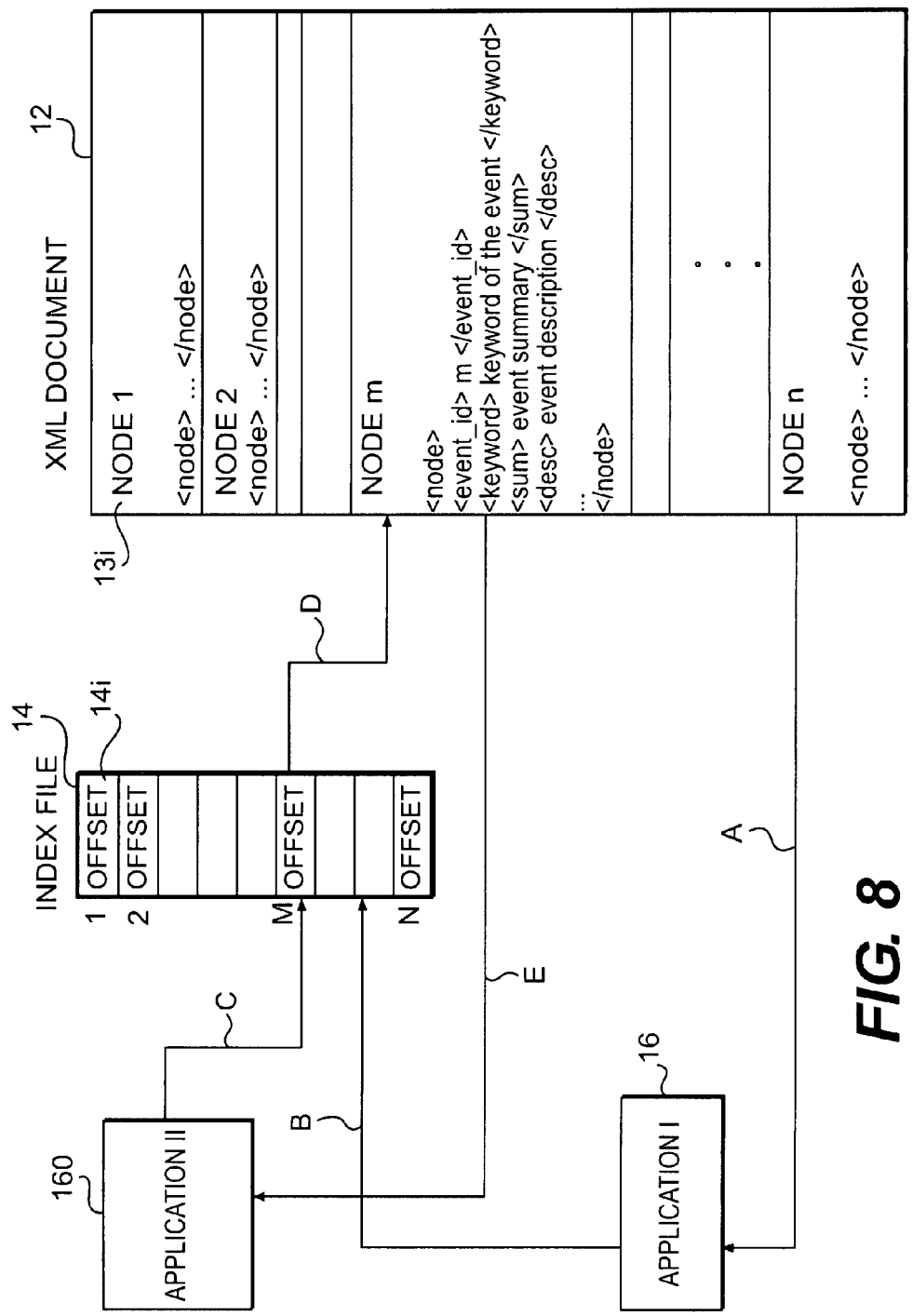
FIG. 8 illustrates an exemplary relationship between an index file, an XML document, and applications that are used to create the index file and to access nodes in the XML document.

FIG. 8 illustrates an exemplary relationship between the Index file, the XML document, and the applications that are used to create the Index file and to access nodes in the XML document. In FIG. 8, XML document 12, which is a static XML document, includes a plurality of nodes $13_i$. Application program 160 has been called to read data at one or more of the nodes $13_i$. To facilitate this data access, application 16 is used to generate Index file 14. The index file 14 includes Offsets $14_i$. The Index file 14 is created when (path A), the application 16 reads the XML document 12 for the first time. Following path B, the application creates the Index file 14. The process of creating the Index file 14 will be described later. With the Index file 14 created, the application 160 may then read data at one or more of the nodes $13_i$. The application 160 begins by reading (path C) the Index file 14 to get the offset value of the nodes $13_i$ in the XML document 12. Based on the offset value, the application 160 retrieves the desired node (path D) from the XML document 12. Following path E, the application 160 receives the data from the desired node.

Figure 5:
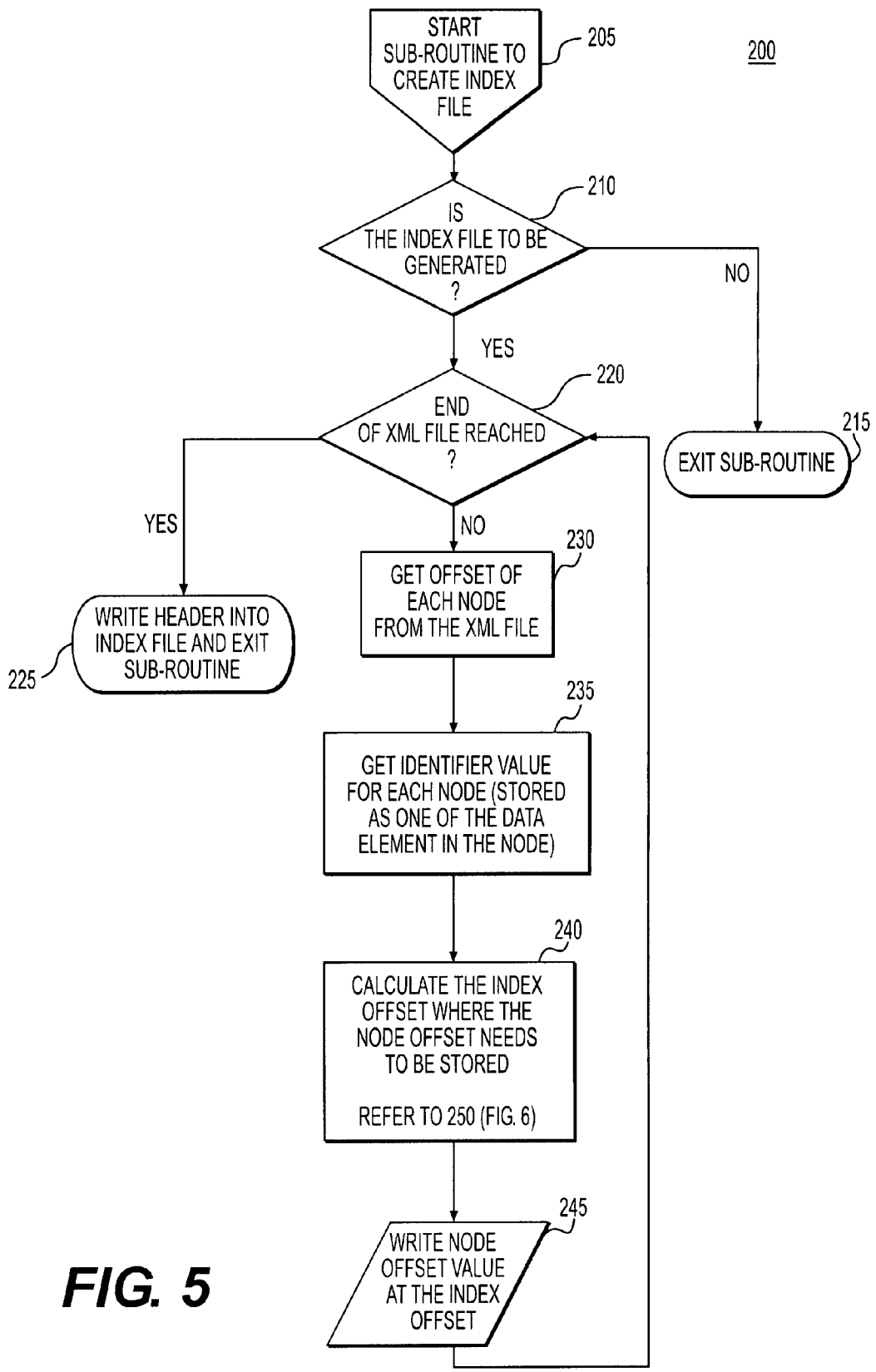
FIG. 5 is a flowchart illustrating an exemplary routine for creating an index file.

Since the XML document is static, the content of the XML document does not change frequently, as would be the case with a dynamic XML document. Thus, the Index file 14 may be built when the application 160 is initiated to run for the first time, and after that the overhead of creating the Index file 14 is only incurred when the XML document 12 actually changes. When the Index file is built, a time stamp may be added to the header of the Index file 14. In the future, when the application 160 is again initiated, the application 160 checks to see if the XML document 12 was modified, or created at a later date than the timestamp in the Index file 14. If so, the Index file 14 is regenerated and this approach would keep the Index file 14 current. The Index file 14 is constructed by parsing through the entire XML document 12 once, determining the offset to each node in the XML document 12, and storing the offset in the appropriate location in the Index file 14. Unused locations in the Index file 14 are filled with a particular "invalid value", such as zero (0). Since the size of the Index file 14 is not necessarily known at the time the Index file 14 is being created, the Index file 14 can be filled with the "invalid value" as the Index file 14 is grown. For example: suppose that the Index file 14 is five entries long, and a node with value ten is found next in the XML document 12. The Index file 14 is then increased to contain ten entries, entries six through nine are filled with the "invalid value", and the offset into the actual XML document 12 to the node which contains the value ten is then entered in the tenth location of the Index file 14. FIG. 5 shows how the Index file 14 is created.

In FIG. 5, index file creation routine 200 begins with block 205, wherein a static XML document is selected from which the Index file will be created. In block 210, the routine 200 determines if the XML document requires creation of an Index file. If an Index file is not needed (e.g., one already exists), processing moves to block 215 and the routine 200 is exited. However, if in block 210, an Index file is to be created, processing moves to block 220, and the routine 200 determines if the end of the XML document has been reached.

If the end of the XML document has been reached, then no further offset values need be generated, and processing moves to block 225, where a header is written into the Index file. The routine 200 then ends.

If in block 220, the end of XML Document point has not been reached, processing moves to block 235, and the routine 200 retrieves an Identifier value for each node in the XML document. The Identifier values are stored as one of the data elements at each node in the XML document. In an embodiment, the Identifier values are unique integers. Processing then moves to block 240 and the routine 200 calculates an Index Offset using Node Offset algorithm 250 (see FIG. 6). Processing then moves to block 245, and the output of the Node Offset algorithm 250 is written to the Index file as the Index Offset. Following block 245, processing returns to block 220.

FIG. 6 is a block diagram of exemplary Node Offset algorithm 250. The algorithm 250 may be stored in the computer system 130 and executed by a processor of the computer system 130. The algorithm 250 takes as inputs, an Identifier value, which is a variable, I; an offset value size Z, which is a constant for all Offsets; and an index file header size H, which is a variable and includes the version, a timestamp, and a flag to indicate if the associated Index file can be used. In the algorithm 250, the Identifier value I is multiplied with the offset value size Z, and the result is added to the header file size H, to produce the Index Offset, O.

With the Index Offset calculated, applications 160 can access the associated static XML document to retrieve data at one or more nodes. In an embodiment, the applications 160 use exemplary XML node fetch routine 300 shown in FIG. 7 to retrieve the data. As shown, the routine 300 uses, as an input 305, the Identifier I, which allows for fetching a corresponding node from the XML document.

In FIG. 7, the routine 300 begins with block 310, as an application attempts to retrieve data associated with one or more nodes in the XML document. In block 315, the routine 300 call algorithm 250 to calculate the index offset value where the desired node offset is stored. In block 320, the routine 300 locates the calculated Index Offset value in the Index file. The routine 300 then reads the Node Offset value from the Index file, block 325.

In block 330, the routine 300 uses the Node Offset value to locate where the node is stored in the XML document. The routine 300 then fetches XML data belonging to the located node, block 335. In block 340, the node data are passed to the application 160 that called the node fetch routine 300, and the routine 300 ends.

The description above explains how to handle the case where the node Identifier used to access the XML document is an integer which only occurs once in the XML document. In this embodiment, performance of the routine 300 may be enhanced when the integers used for the node value are low values and are sequential, since the size of the Index file is the largest integer multiplied by the size of an offset, plus a small constant. Other embodiments of this concept may be used, as follows.

To search for a node type that contains an arbitrary value, including a text string or widely spaced integers, a hashing scheme is used to convert the node value to an integer. A simple way to do this for a text string would be to add all of the characters in the string, ignoring round-off. (This step can be skipped for the case of widely spaced integers.) Next, the integer value determined above is divided by the number of offset values that will be saved in the index file. Since the number of nodes in the XML document is not known before reading through the XML document, this could be done by parsing twice. That is, the first attempt at parsing will identify the number of nodes in the XML document. The Index files size then can be adjusted to accommodate this number of nodes, and the parsing operation repeats. Performance will be much better if the Index file contains significantly more offset entries than there are unique XML entries, and the Index file should be at least somewhat larger than the number of unique XML entries. Assuming a large Index file size is a good technique and may avoid the need for a second parsing operation. Also, if the XML document is updated occasionally, but the size (number of nodes) changes slowly, then the size to make the Index file could be can be inferred from the previous XML document.

Once the Index file size is determined, the Index file is created and pre-filled with the "invalid value" entry. The XML document is then parsed. For each node being indexed, that node's index value is computed by performing the hash algorithm on its content and then dividing by the Index file number of entries. The Index file location at that offset is then checked to see if an invalid value is present. If so, the offset to that node in the XML document is stored in that location in the Index file, overwriting the invalid value. Otherwise, the index value is increased to the next offset (wrapping from the end of the Index file to the start), and the above check to see if the location is already taken is repeated until an unused location is found.

In this second embodiment of an Index file, to look up an entry, the hash algorithm is run on the entry value to be looked up, and then the resulting value is divided by the Index file number of entries. The corresponding offset is then fetched from the Index file, a seek is done to that offset in the XML document and the node is parsed. If the value of the node type being used as an index in the XML document at that location does not match the actual index node value, then the next location in the Index file is used and the process repeats. The process is complete when either the desired entry is found or the offset value in the Index file is the invalid value, meaning that the entry is not present in the XML document.

Another approach can be used that will speed up the search process, although using this embodiment takes longer to create the Index file. This alternate embodiment relies on keeping both the hash value and the offset in the Index file and maintaining the hash values in numerical order. To create the Index file, the XML document is parsed, and the hash algorithm is run on each entry in turn (but the result is not divided by the Index file number of entries). The discovered hash value is inserted into the Index file in numerical order, along with the offset where the value resides in the XML document. This approach requires moving a lot of data in the Index file during its creation, so that the hash values in the Index file will be in order.

In this third embodiment of the Index file, to find a value in the XML document, the hash algorithm is run on the node value. A binary search of the hash entries in the Index file is then performed until the first entry with that hash value is either found, or that hash value is found to not exist. If found, the offset can be obtained from the Index file and the XML file accessed as described before. When a node in the XML document is located, the value of the node is compared to the search value: if they match, the desired record is found. If they do not match, then the next value from the Index file is fetched and the hash values compared. If the hash value matches, the process is repeated. If the matching hash values in the Index file are exhausted without finding the matching entry in the XML document, then the value is not present in the XML document.

Figure 9:
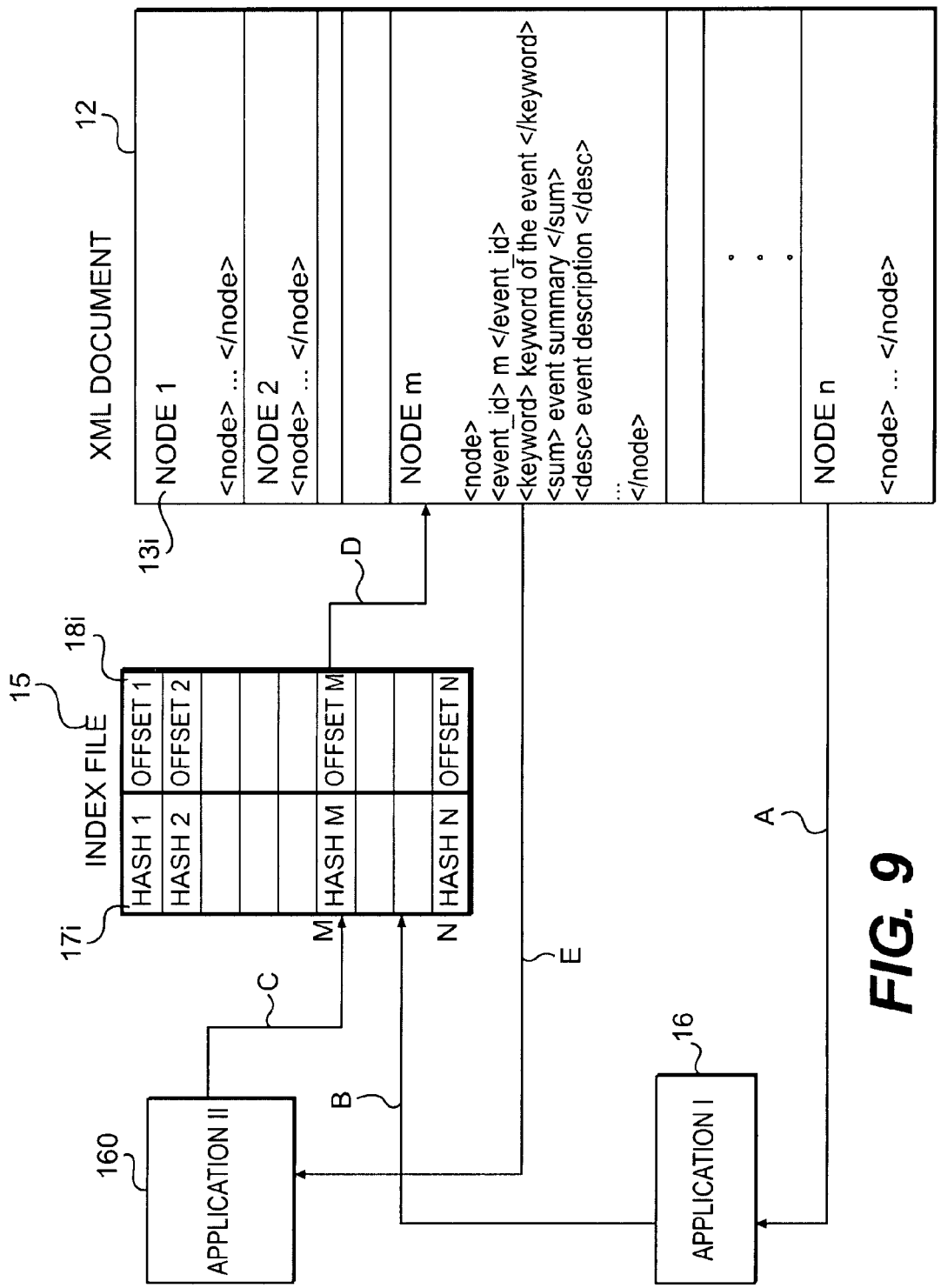
FIG. 9 illustrates another exemplary relationship between an index file, an XML document, and applications that are used to create the index file and to access nodes in the XML document.

FIG. 9 illustrates another exemplary relationship between the Index file, an XML document, and applications that are used to create the Index file and to access nodes in the Index file. In the embodiment shown in FIG. 9, hash values are used, and are stored with the offset values in the Index file.

In yet a further embodiment, more than one node type can be used to access the XML document. In this embodiment, a separate Index file is created for each node type using one of the techniques discussed above for each such Index file.

The invention claimed is:

1. A method, executed on a computing device, for accessing data contained in a static XML document by parsing the static XML document, the method, comprising:
for each node in the static XML document, determining a Node Offset value, at least in part, by parsing the static XML document; and
storing, performed by a computer processor, the Node Offset value as an index offset value into an index file, wherein the index offset value is equal to adding a size, H, of a header of the index file with a product of an identifier value, I, multiplied by a size, Z, of the Node Offset and wherein the index offset value is used by an application program so that the application program can directly retrieve the data contained in the static XML document, wherein the retrieving is performed without parsing the entire static XML document.

2. The method of claim 1, further comprising storing the Node Offset values sequentially in the index file.

3. The method of claim 2, wherein the index file includes the header, the method further comprising adding a time stamp to the header.

4. The method of claim 3, further comprising:
determining if the static XML document has been modified, comprising comparing the time stamp in the header to a time reference in the XML document.

5. The method of claim 3, wherein determining the node offset value comprises computing the index offset value, comprising:
retrieving the identifier value, I;
multiplying the identifier value I with a value corresponding to the size, Z, of the node offset; and
adding the product of I×Z to the size, H, of the header in the index file to produce the index offset value.

6. The method of claim 2, wherein the application program accesses nodes in the XML document to retrieve data, comprising:
calculating the index offset where a desired node offset is stored;
locating the node offset value in the index file;
reading the node offset value;
using the node offset value, locating the desired node in the XML document; and
fetching the data from the located node.

7. A computer-readable medium including code stored thereon to allow an application program to access data in a static XML document, the code, when executed, comprising the steps of:
for each node in the static XML document, determining a Node Offset value, at least in part, by parsing the static XML document; and
storing the Node Offset value as an index offset value into an index file, wherein the index offset value is equal to adding a size, H, of a header of the index file with a product of an identifier value, I, multiplied by a size, Z, of the Node Offset and wherein the index offset value is used by an application program so that the application program can directly retrieve the data contained in the static XML document, wherein the retrieving is performed without parsing the entire static XML document.

8. The computer-readable medium of claim 7, wherein the method further comprises the step of the Node Offset values sequentially in the index file.

9. The computer-readable medium of claim 8, wherein the index file includes the header, the method further comprising the step of adding a time stamp to the header.

10. The computer-readable medium of claim 9, wherein the method further comprises the step of:
determining if the static XML document has been modified, comprising comparing the time stamp in the header to a time reference in the XML document.

11. The computer-readable medium of claim 9, wherein determining the Node Offset value comprises computing the index offset value, and wherein the method further comprises the steps of:
retrieving the identifier value, I;
multiplying the identifier value I with a value corresponding to the size, Z, of the node offset; and
adding the product of I×Z to the size, H, of the header in the index file to produce the index offset value.

12. The computer-readable medium of claim 9, wherein the application program accesses nodes in the XML document to retrieve data, and wherein the method further comprises the steps of:

calculating the index offset where a desired node offset is stored;

locating the node offset value in the index file;

reading the node offset value;

using the node offset value, locating the desired node in the XML document; and fetching the data from the located node.

13. A method used by a program for accessing data in a static XML document using index values, the method, comprising:

calculating an index offset value corresponding to a corresponding node offset value, wherein the index offset value is equal to adding a size, H, of a header of the index file with a product of an identifier value, I, multiplied by a size, Z, of the Node Offset;

locating the calculated index offset value in an index file;

reading the corresponding node offset value from the index file; and using, performed by a computer processor, the node offset value, locating a corresponding node in the static XML document, wherein the locating is performed without parsing the entire static XML document.

14. The method of claim 13, wherein the index file does not exist for the static XML document, further comprising creating the index file by parsing the static XML document, comprising:

retrieving identifier values for one or more nodes in the XML document;

calculating an index offset value for each of the one or more nodes; and storing the index offset values in the index file.

15. The method of claim 14, wherein the identifier values are unique integer values.

16. The method of claim 14, wherein the identifier values are arbitrary, non-integer values, further comprising:

estimating a size of the index file, whereby a number of locations in the index file is estimated;

filling each location in the index file with an invalid entry value;

parsing the static XML document, comprising:

using a hashing scheme, converting the identifier values to integer values, and dividing the integer values by the number of locations in the index file;

storing the divided integer values at locations having invalid entries; and if required, resizing the index file and reparsing the static XML document.

17. The method of claim 16, further comprising storing hash values in the index file.

18. The method of claim 16, further comprising storing the hash values in numerical order.

19. The method of claim 16, wherein the arbitrary values are one of a text string, non-unique integers, and widely spaced integers.

20. The method of claim 14, where multiple node types are used to access the XML document, further comprising creating an index file for each node type.

* * * * *